No. 793,390. PATENTED JUNE 27, 1905.
P. A. NIPSTAD & O. LARSON.
ROTARY ENGINE.
APPLICATION FILED APR. 24, 1905.

2 SHEETS—SHEET 1.

Witnesses.
A. H. Opsahl.
E. W. Jeppesen.

Inventors.
Peter A. Nipstad.
Ole Larson.
By their Attorneys.
Williamson Merchant No. 793,390. PATENTED JUNE 27, 1905.
P. A. NIPSTAD & O. LARSON.
ROTARY ENGINE.
APPLICATION FILED APR. 24, 1905.
2 SHEETS—SHEET 2.
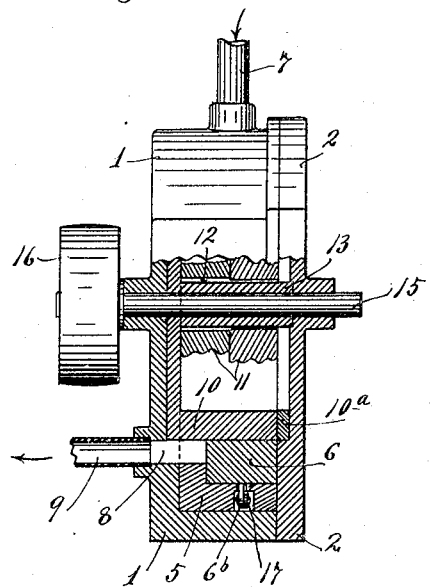
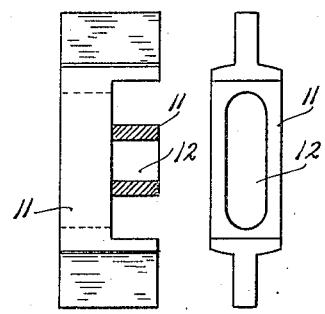
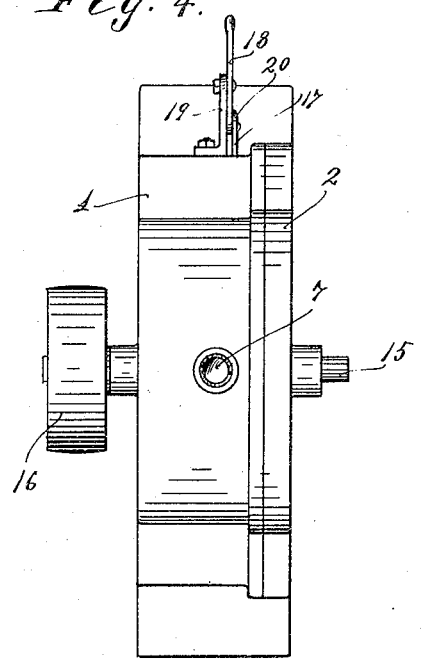
Witnesses.
A. H. Opsahl.
E. W. Jeppesen.
Inventors.
Peter A. Nipstad.
Ole Larson.
By their Attorneys.
Williamson & Merchant No. 793,390.

Patented June 27, 1905.

UNITED STATES PATENT OFFICE.

PETER A. NIPSTAD AND OLE LARSON, OF VIG, SOUTH DAKOTA.

ROTARY ENGINE.

SPECIFICATION forming part of Letters Patent No. 793,390, dated June 27, 1905.

Application filed April 24, 1905. Serial No. 257,027.

*To all whom it may concern:*

Be it known that we, PETER A. NIPSTAD and OLE LARSON, citizens of the United States, residing at Vig, in the county of Roberts and State of South Dakota, have invented certain new and useful Improvements in Rotary Engines; and we do hereby declare the following to be a full, clear, and exact description of the invention, such as will enable others skilled in the art to which it appertains to make and use the same.

Our invention relates to rotary engines, and has for its object to simplify and improve the same in the several particulars hereinafter noted.

The invention consists of the novel devices and combination of devices hereinafter described, and defined in the claims.

In the accompanying drawings, which illustrate our invention, like characters indicate like parts throughout the several views.

Figure 1:
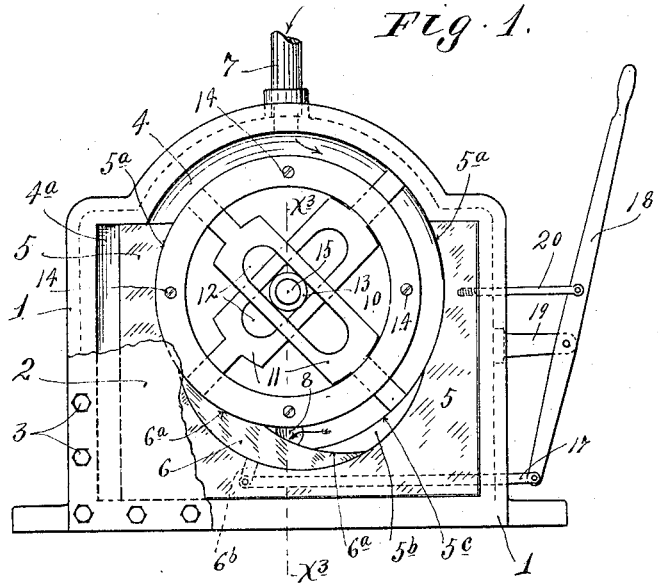
Figure 2:
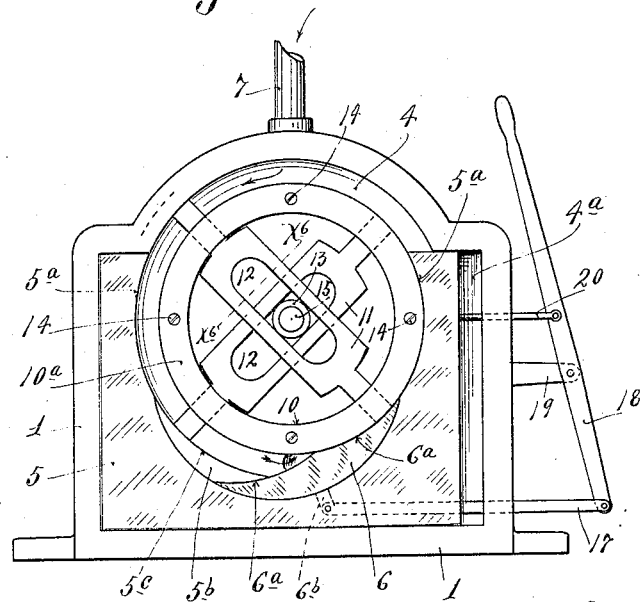

Figure 1 is a view in front elevation with some parts broken away and some removed, showing the improved engine. Fig. 2 is a view similar to Fig. 1, but shows the parts in different position. Fig. 3 is a view, partly in side elevation and partly in section, on the line $x^3$ $x^3$ of Fig. 1. Fig. 4 is a plan view of the engine. Fig. 5 is a detail showing the propeller-blades removed from the engine, one of the side blades being shown in section on the line $x^6$ $x^6$ of Fig. 2; and Fig. 6 is a detail in front elevation of one of the propeller-blades.

The numeral 1 indicates the cylinder-casting, which at its base is flanged, so that it is adapted to be rigidly secured to the floor or other suitable support. This casting 1 is provided at one side with the detachable plate 2, that is adapted to be secured thereto by screws or bolts 3 or other suitable devices. The cylinder-casting 1 is formed with an internal piston-seat 4, that is cylindrical throughout its upper portion and at its lower portion is extended outward to form the seat $4^a$ for an abutment-block 5, that closely fits said seat at its sides, but is adapted to slide from the position indicated in Fig. 1 into the position indicated in Fig. 2, and vice versa. This abutment-block at its sides is provided with cylindrical surfaces $5^a$, and its lower portion is provided with a depressed seat $5^b$. When the abutment-block 5 is moved toward the right, as shown in Fig. 1, the surface $5^a$ at the right forms a continuation of the cylindrical surface or piston-seat, and when said block is forced toward the left, as shown in Fig. 2, its cylindrical surface $5^a$ at the left forms a continuation of the cylindrical surface or piston-seat. The depressed seat $5^b$, it will be noted, extends less than completely through the block, so that the cylindrical surfaces are connected by cylindrical surface $5^c$. In this seat $5^b$ is a loose segmental cam-block 6, the inner surface of which is formed with intersecting segmental surfaces $6^a$.

The numeral 7 indicates a steam-supply pipe which opens into the upper portion of the piston-seat 4, and the numeral 8 indicates an exhaust-port which opens from the lower portion of said piston-seat and, as shown, leads to an exhaust-pipe 9, which is screwed into the fixed side plate of the cylinder-casting 1.

The numeral 10 indicates the rotary piston, which is provided with a projecting angular flange through which work the ends of a pair of diametrically-extended propeller-blades 11. The intermediate portions of these propeller-blades are reduced, so that they overlap each other at an angle of ninety degrees, as shown in Figs. 2, 3, and 5. The reduced intermediate portions of said propeller-blades are provided with longitudinal slots 12, through which is passed a bearing-sleeve 13, (shown as formed integral with said rotary piston 10.) The angular flange of the piston 10 is provided with a detachable clamping-ring $10^a$, held thereto by screws 14 or other suitable devices. When this clamping-ring $10^a$ is removed and the rotary piston is removed from working position, the propeller-blades 11 may be removed laterally from working positions.

A shaft 15 is passed through suitable bearings on the cylinder-casting 1 and on the removable plate 2 and is also passed through the sleeve 13 of the piston 10, but is rigidly secured to the latter. At one end the shaft 15 is shown as provided with a pulley 16, over which a power-driven belt (not shown) may be run to transmit power from the engine.

The cam-block 6 (see particularly Fig. 3) is provided with a depending lug $6^b$, to which is pivotally attached a link 17. The base of the abutment-block 5 is cut away to afford clearance for the lug $6^b$ and link 17, and the said link is also passed through one side of the cylinder-casting 1 and is pivotally attached to the lower end of the reversing-lever 18. The lever 18 is fulcrumed on the lug 19, projecting from one side of the cylinder-casting 1. The link 20, which also works through a suitable passage in one side of the cylinder-casting 1, connects the sliding abutment-block 5 to the reversing-lever 18 at a point above its fulcrum.

When the lever 18 is set in the position indicated in Fig. 1, the abutment-block 5 will be thrown toward the right and the cam-block 6 will be thrown toward the left. Under these adjustments the live steam entering through the pipe 7 will react on upper portion of the left-hand projection of the abutment-block 5 and against the upperly-projecting end of one of the propeller-blades 11, thereby causing the rotary piston 10 to rotate in the direction indicated by the arrows marked at periphery thereof in Fig. 1. It will also be noted that, as shown in Fig. 1, the cam-block 6 starts in such position that its right-hand cam-surface $6^a$ will be engaged in succession by the projecting ends of the propeller-blades, thereby forcing the said propeller-blades endwise and causing them to project at their upper ends into the angular channel formed between the periphery of the rotary piston and the surrounding surface of the piston-seat, formed within the cylinder-casting.

When the lever 18 is thrown into the position shown in Fig. 2, the abutment-block 5 will be thrown toward the left and the cam-block 6 will be thrown toward the right, thereby reversing the direction of the rotation of the rotary piston, as will be obvious by an inspection of said Fig. 2.

The engine described is simple and has no parts that are liable to get out of order.

It will of course be understood that the engine described is capable of modification within the scope of our invention as herein set forth and claimed.

The device while designed for the use of a rotary engine may be used as a rotary pump. When used as an engine, it may of course be driven either by steam or compressed air.

What we claim, and desire to secure by Letters Patent of the United States, is as follows:

1. The combination with a cylinder and a rotary piston working therein, said piston having a diametrically-movable propeller-blade, of an abutment-block mounted for sliding movement and having, on opposite sides of said rotary piston, cylindrical surfaces adapted to be alternately engaged with the peripheral portion of said piston, an oscillating cam-block seated in said abutment-block and adapted to be moved so that its opposite end portions will engage alternately with the peripheral portion of said piston, and operative connections to said abutment-block and to said cam-block for alternately moving the same in opposite directions, substantially as described.

2. The combination with a cylinder-casting 1, having a detachable side plate 2 and a depending seat 4, of a rotary piston 10 working in said depending seat 4 and having a shaft journaled in said cylinder-casting 1 and detachable plate, a pair of propeller-blades 11 working diametrically through said rotary piston, an abutment-block 5 mounted to slide in the seat formed in said cylinder-casting, said abutment-block having the cylindrical surface $5^a$ on opposite sides of said piston and having the depressed seat $5^b$ and curved web $5^c$, said lettering connecting said surface $5^a$, the segmental cam-block 6 seated in said depressed seat $5^b$, suitable admission and exhaust ports leading into and from said piston-seat, and a reversing-lever connected to said abutment-block and to said cam-block and arranged to impart reverse movements thereto, substantially as described.

In testimony whereof we affix our signatures in presence of two witnesses.

PETER A. NIPSTAD.
OLE LARSON.

Witnesses:
ANDREW KRINGEN,
C. D. THOMPSON.